Figure 5:
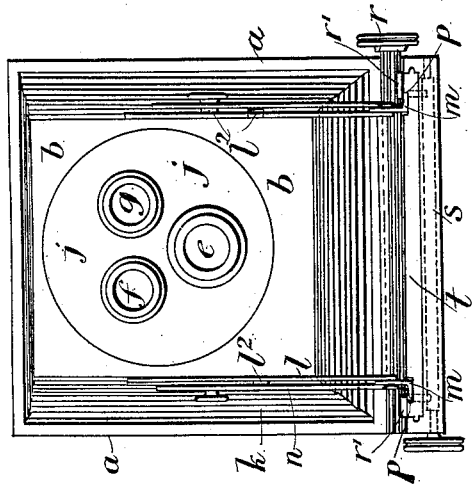

(No Model.) 3 Sheets—Sheet 1.
J. E. THORNTON.
PHOTOGRAPHIC CAMERA.
No. 379,343. Patented Mar. 13, 1888.
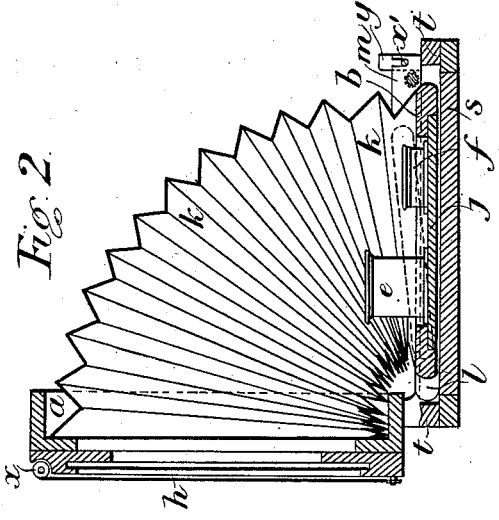
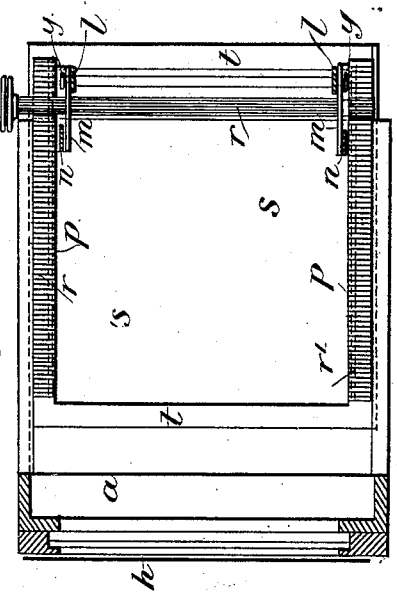
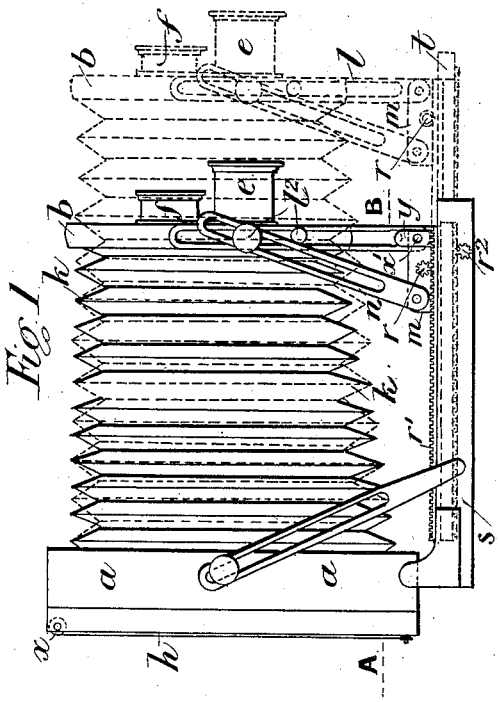
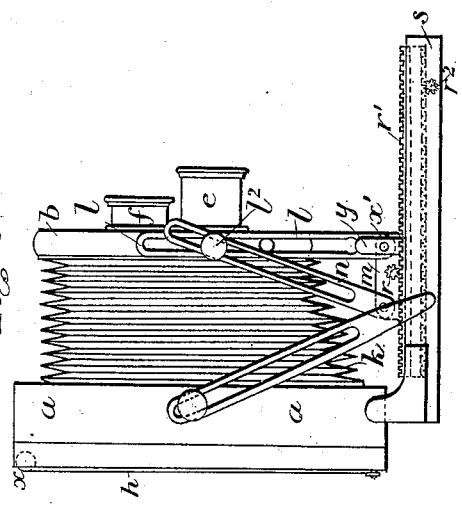
WITNESSES.
Chas. Amon
Chas. Foulds
INVENTOR.
John E. Thornton.
Per
James N. Lancaster,
Attorney.

(No Model.) 3 Sheets—Sheet 2.

J. E. THORNTON.
PHOTOGRAPHIC CAMERA.

No. 379,343. Patented Mar. 13, 1888.

WITNESSES
Chas. Amon
Chas. Foulds

INVENTOR
John E. Thornton
Per
James N. Lancaster
Attorney (No Model.) 3 Sheets—Sheet 3.
J. E. THORNTON.
PHOTOGRAPHIC CAMERA.
No. 379,343. Patented Mar. 13, 1888.
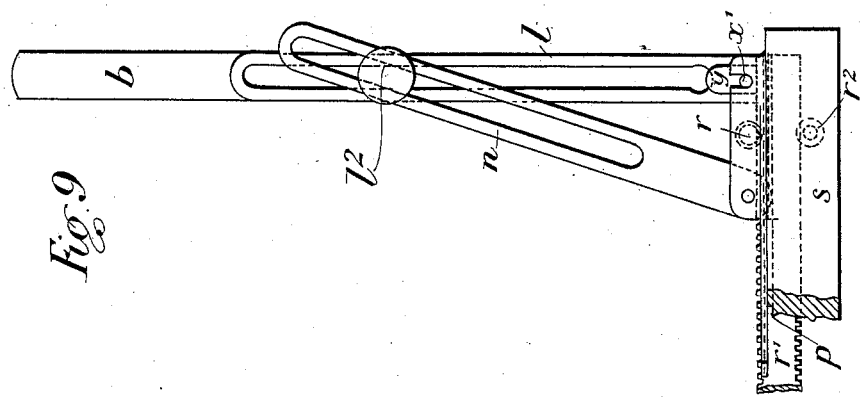
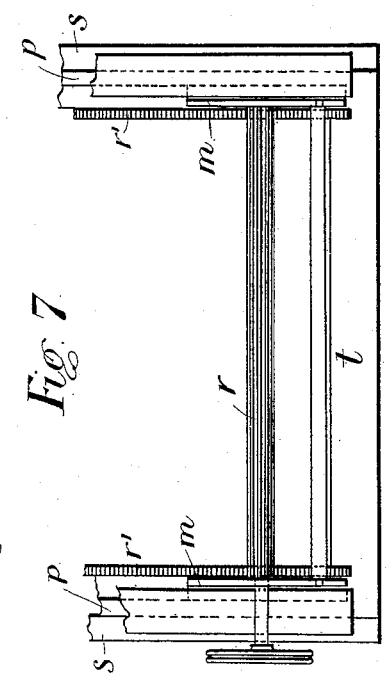
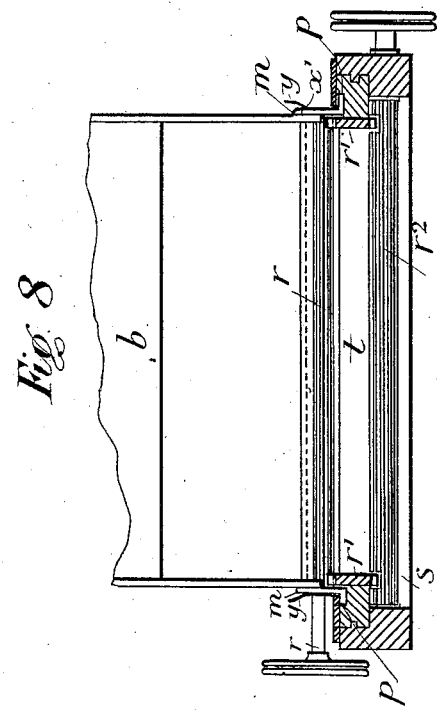
WITNESSES
Chas. Amon
Chas. Foulds
INVENTOR.
John E. Thornton,
Per
James H. Lancaster
Attorney

UNITED STATES PATENT OFFICE.

JOHN EDWARD THORNTON, OF MANCHESTER, COUNTY OF LANCASTER, ENGLAND.

PHOTOGRAPHIC CAMERA.

SPECIFICATION forming part of Letters Patent No. 379,343, dated March 13, 1888.

Application filed July 16, 1887. Serial No. 244,547. (No model.) Patented in England February 24, 1886, No. 2,670.

*To all whom it may concern:*

Be it known that I, JOHN EDWARD THORNTON, a subject of the Queen of Great Britain, and a resident of Manchester, in the county of Lancaster, England, have invented certain new and useful Improvements in Photographic Cameras, (for which I have obtained a patent in Great Britain, No. 2,670, dated February 24, 1886,) of which the following is a full, clear, and exact specification thereof.

The improvements which are the subject of this invention relate to the form and construction of photographic cameras; and the object of my invention is to affect a reduction in the weight of photographic cameras by the avoidance of accessories and external requirements or replacements of duplicates and loose parts.

In constructing a photographic camera according to my invention I form the front board or panel, to which the lens is usually attached, of the ordinary shape and with a circular opening of a suitable size through the center. I fit into this opening a revolving panel or table, to which I attach two or more lenses in such positions that by revolving the said table one or other of the lenses, as required, may have a central position and come opposite center of plate. The front board is supported between fork and with struts in the usual way, and constructed in such a manner that while the said front board is prevented from having any pivoting or swinging motion between the fork sufficient rise and fall may be obtained vertically to allow any one of the lenses which are attached to front board being placed opposite center of either upper or lower half of plate. By these means a lens of the size required may be used without detaching the unrequired sizes of lenses from the camera, which thus remains always complete and ready for use. When the operator desires to pack the camera, the revolving table or panel with the lenses affixed is reversed. The front board with the lenses attached is then laid down on the base-board, the bellows forming a receptacle or packing-space for the lenses, thus obviating the necessity for their removal from the front board. I do not attach the front board to the sliding frame; but in lieu thereof I support the said front board between a fork attached to angular side sliding plates. For the purpose of readily attaching or detaching the fork to the sliding plates I form a stud or projection on each side of lower part of fork. These studs fit into holes formed in flat springs attached to said sliding plates. The springs retain the fork in position, and the fork is easily detached for closing the camera by pressure on the springs. The angular side sliding plates travel along grooves in the extension-frame, and are actuated by a pinion working into racks attached to the sliding frame. I form these racks with teeth on both their upper and lower edges. A pinion working in the teeth on the upper side of racks causes the fork carrying front board with lenses attached to travel backward and forward, and the extension-frame is worked by the usual pinion underneath.

When it is preferred to draw out or close the base-board or extension-frame or sliding plates quicker than by the operation of rack and pinion, the teeth of the pinions are cut away for a portion of their length, and the pinions are withdrawn from contact with the racks by transverse pressure on the pinions or pinion-spindles. The base-board or extension-frame or sliding plates are thus free to be drawn out or pushed in by hand. The pinions regain their previous position by means of spiral or flat springs, which retain them always in gear with racks except when purposely displaced. In place of the ordinary ground glass I use as a focusing-screen a suitable flexible translucent material, such as gold-beater's skin, paper prepared with varnish or gelatine, parchment, or other suitable material, wound on a roller with a spring attached, which I fit on one side of aperture of camera-body. The method of using this focusing-screen is the same as an ordinary spring-blind, being held at one side by a fastener when required in use, and winding itself on the roller when released. The requisite tension on the screen is obtained by the spiral spring on roller.

Figure 6:
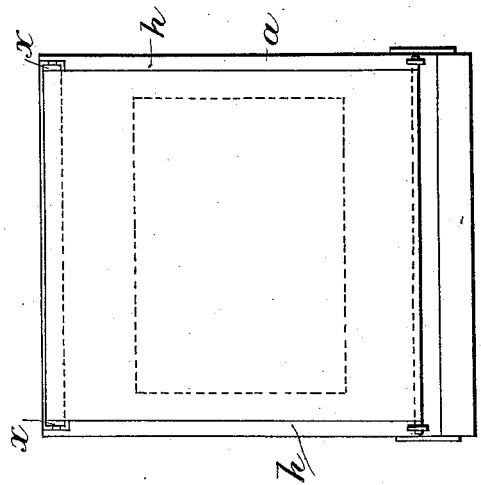

In the drawings, Figure 1 represents a side view. Fig. 2 is a longitudinal section of camera; Fig. 3, a side view contracted. Fig. 4 represents a sectional plan taken on line A B. Fig. 5 is a front view of the camera. Fig. 6 is a back view of the camera-body. Figs. 7, 8, and 9 are a plan, transverse section, and elevation.

$b$ is the front board in position, and to which are attached lenses $e$, $f$, and $g$. The lens $e$ is placed opposite center of camera back or plate; but either one or other of the lenses $f$ and $g$ may be placed alternately in a central position by revolving the table $j$. The fork $l$, which may be of any shape or form preferred, supports the front board, $b$, rigidly in a vertical position, but permits of the said front board being raised or lowered vertically, so as to place either of the lenses $e$, $f$, or $g$ opposite the center of either upper or lower half of plate. The means I employ, as shown in the drawings, is by a groove in the fork $l$, in which either two studs, $l^2$, placed at a distance apart, or an elongated projection on sides of front board, serve the purpose of a vertical slide, at the same time preventing any oscillating motion in the front board, $b$. The front board $b$, with the fork $l$ attached, is disconnected from the extension-frame $t$, and with the revolving panel $j$ reversed is laid down on the base-board $s$, so that when the camera-body $a$ is closed the lenses $e$, $f$, and $g$ occupy a position and are packed within the bellows $k$ without being removed from the camera. The angular sliding plates $m$ support the fork $l$ and struts $n$, and travel with them along the extension-frame $t$ in grooves $p$, being actuated by pinion $r$ and racks $r'$. The extension-frame $t$ is represented in Fig. 1 by dotted lines as being extended in the usual way.

In one of the figures of the drawings the camera is represented as contracted for a short focus by the angular side sliding plates, $m$, with the front board, $b$, attached, having been moved nearer to camera-body by the pinion $r$, working in racks $r'$, causing the angular plates $m$ to slide in the grooves $p$.

In the back view of camera-body $a$ is shown the focusing screen $h$, of suitable translucent material, attached to spring-roller $x$.

Figs. 7, 8, and 9 are a part of camera, showing grooves $p$ for sliding plates $m$, and also a modification of racks, in combination with sliding plates in which a narrower form of rack is applied in lieu of broad rack, as represented in Figs. 1 to 5.

In the several views, $y$ is the flat spring, into which the stud $x$ is fitted, as hereinbefore described.

Having now particularly described and ascertained the nature of my said invention and in what manner the same is to be performed, I declare that what I claim is—

1. The combination, with a photographic camera, herein described, of the angular sliding plates $m$, fork $l$, and struts $n$, and flat springs $y$, substantially as shown and described.

2. In the extension-frame of a photographic camera, the rack or racks, with teeth formed on their upper and lower edges, and in combination therewith the bottom pinion, $r^2$, and the extension-pinion $r$, actuating the angular side sliding plates, carrying fork, stretchers, and front board, substantially as hereinbefore described.

In testimony that I claim the foregoing I have hereunto set my hand.

JOHN EDWARD THORTON.

Witnesses:
ARTHUR C. HALL,
ALBERT E. HALL,
9 *Main Street, Manchester, England.*